(12) United States Patent
Tayebati

(10) Patent No.: US 6,788,408 B2
(45) Date of Patent: Sep. 7, 2004

(54) WAVELENGTH MONITORING SYSTEM

(76) Inventor: Parviz Tayebati, 2 Commonwealth Ave., Boston, MA (US) 02116

(*) Notice: Subject to any disclaimer, the term of this patent is extended or adjusted under 35 U.S.C. 154(b) by 0 days.

(21) Appl. No.: 10/357,637

(22) Filed: Feb. 4, 2003

(65) Prior Publication Data

US 2003/0174327 A1 Sep. 18, 2003

Related U.S. Application Data

(63) Continuation of application No. 09/750,440, filed on Dec. 28, 2000, now Pat. No. 6,515,752.

(51) Int. Cl.[7] ............................. G01J 3/06; G01J 3/18
(52) U.S. Cl. ..................................... 356/308; 356/328
(58) Field of Search ................................. 356/308, 326, 356/328, 334

(56) References Cited

U.S. PATENT DOCUMENTS 2,339,754 A * 1/1944 Brace ........................ 356/308
4,448,529 A * 5/1984 Krause ....................... 356/326
5,822,060 A * 10/1998 Linowski et al. ........... 356/328
5,825,792 A   10/1998 Villeneuve et al.

* cited by examiner

Primary Examiner—F. L. Evans
(74) Attorney, Agent, or Firm—Stebing McGuiness & Manaras LLP

(57) ABSTRACT

A wavelength monitoring system for continuously monitoring the wavelengths of different optical channels transmitted through a wavelength division multiplexed (WDM) fiberoptic system. In one construction, an optical diffraction grating is used to disperse the light being monitored onto a rotating polygon having mirrors on the facets thereof, such that the rotating polygon reflects the light onto a detector located behind a slit. In a second construction, the light is projected onto a rotating, hollow transparent cylinder having a thin film filter deposited on a surface thereof, wherein the thin film filter comprises a Fabry-Perot structure which has a gap which varies as a function of its position on the rim of the cylinder, such that the varying gap allows for a varying transmission wavelength which varies as a function of angular position. A detector is positioned in the interior of the cylinder to detect light passing through the rotating thin film filter.

3 Claims, 3 Drawing Sheets

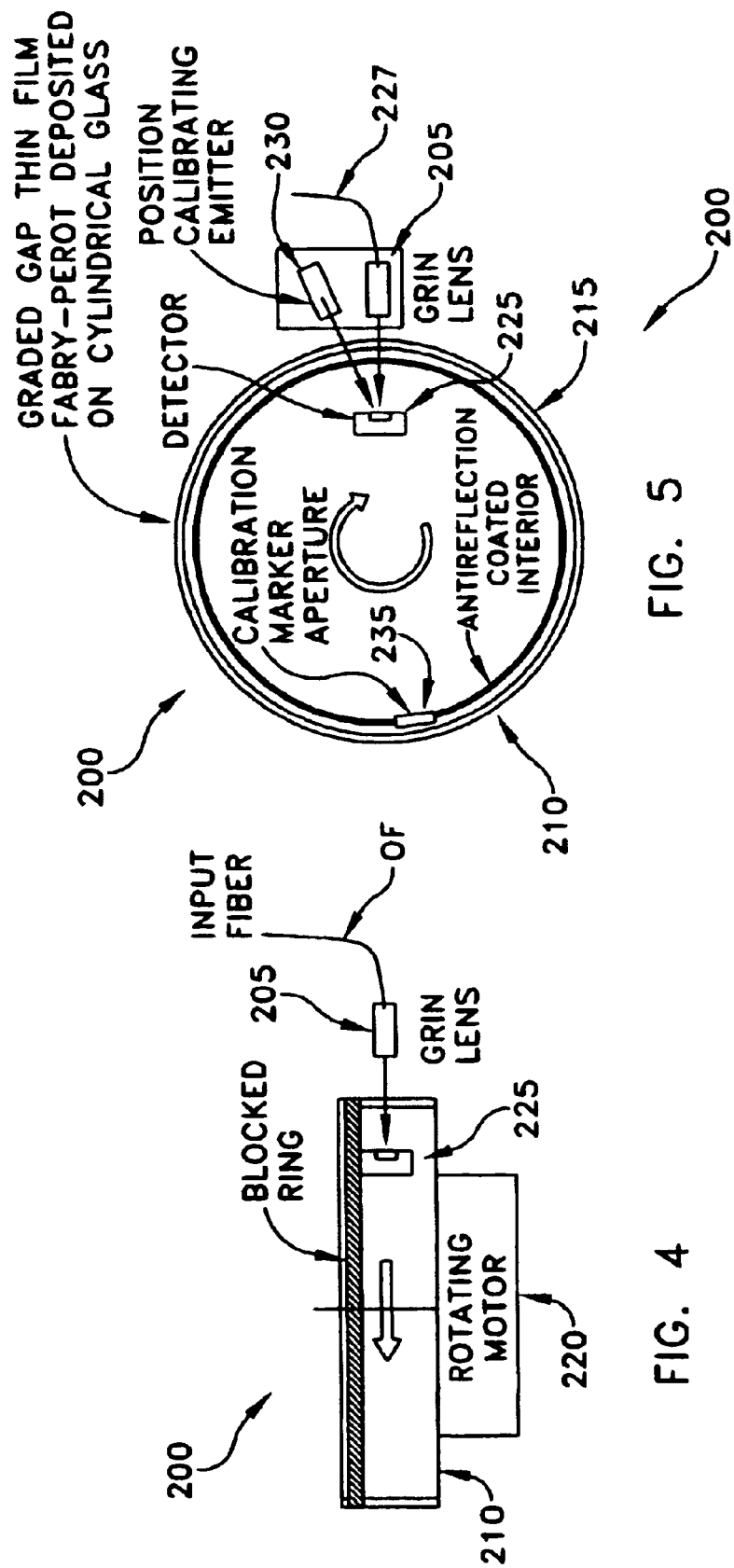

WAVELENGTH MONITORING SYSTEM

REFERENCE TO PENDING PRIOR PATENT APPLICATION

This is a continuation of pending prior U.S. patent application Ser. No. 09/750,440, filed Dec. 28, 2000 now U.S. Pat. No. 6,515,752 by Parviz Tayebati for WAVELENGTH MONITORING SYSTEM.

FIELD OF THE INVENTION

This invention relates to optical systems in general, and more particularly to wavelength monitoring systems.

BACKGROUND OF THE INVENTION

In many situations, it is necessary or desirable to monitor the wavelength of a beam of light.

By way of example, in wavelength division multiplexed ("WDM") optical network systems, multiple optical signals can be simultaneously transmitted (or "multiplexed") on a single optical fiber. Such multiplexing is performed by simultaneously transmitting the different optical signals down the optical fiber at different wavelengths (or "channels"). The different optical signals are subsequently de-multiplexed by selectively filtering a desired signal from the group of signals, based on the particular wavelength (or channel) of the target signal. Therefore, in such optical network systems, it is desirable to facilitate the monitoring of different signals at different wavelengths (or channels) on an optical fiber.

SUMMARY OF THE INVENTION

Accordingly, one object of the present invention is to provide novel apparatus for monitoring the wavelength of a beam of light.

Another object of the present invention is to provide novel apparatus for monitoring the wavelengths of different optical channels transmitted through a WDM fiberoptic system.

And another object of the present invention is to provide novel apparatus for continuously monitoring the wavelengths of different optical channels transmitted through a WDM fiberoptic system.

Still another object of the present invention is to provide a novel method for monitoring the wavelength of a beam of light.

Yet another object of the present invention is to provide a novel method for monitoring the wavelengths of different optical channels transmitted through a WDM fiberoptic system.

And another object of the present invention is to provide a novel method for continuously monitoring the wavelengths of different optical channels transmitted through a WDM fiberoptic system.

These and other objects are addressed by the present invention, which comprises the provision and use of a novel wavelength monitoring system for monitoring the wavelength of at least one optical channel transmitted through an optical system.

In one form of the invention, the novel wavelength monitoring system comprises an optical diffraction grating, a rotating polygon having a reflective mirror on each facet thereof, and an avalanche detector positioned behind a slit; wherein the optical diffraction grating receives the light which is to be monitored from the optical system, disperses that light, and projects the dispersed light onto the rotating polygon; and wherein the mirrors of the rotating polygon reflect the dispersed light coming off the optical diffraction grating so that the dispersed light passes through the slit and falls onto the avalanche detector; such that the output of the avalanche detector peaks every time a streak of light, corresponding to a different wavelength at a designated channel, passes by the detector.

In another form of the invention, the novel wavelength monitoring system comprises a hollow, transparent cylinder having a thin film filter deposited on a surface thereof, a motor, and a detector; wherein the thin film filter is a Fabry-Perot structure having a gap which varies as a function of its position on the rim of the cylinder, such that the varying gap allows for a varying transmission wavelength which varies as a function of angular position; and wherein the light passing through the thin film filter falls on the detector.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein:

FIG. 4 is a schematic sectional view of a second system formed in accordance with the present invention; and FIG. 5 is a schematic top view of the system shown in FIG. 4.

DETAILED DESCRIPTION OF THE PREFERRED EMBODIMENTS

Figure 1:
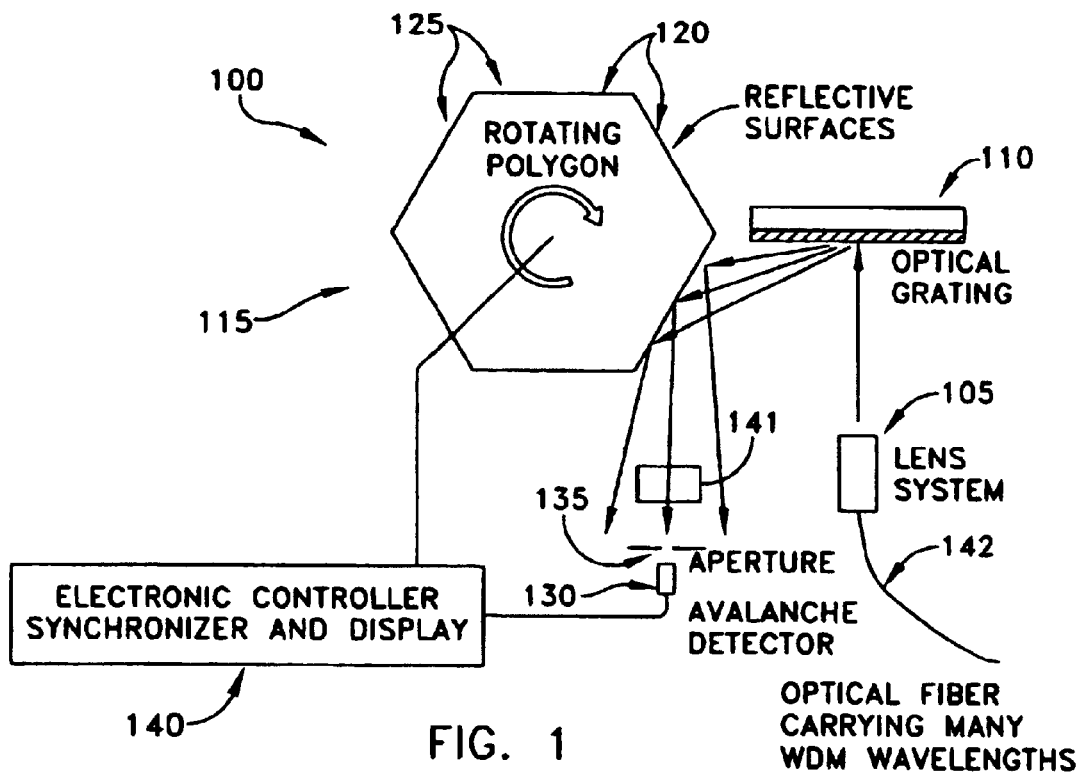
FIG. 1 is a schematic view of a first system formed in accordance with the present invention.

Looking first at FIG. 1, there is shown a wavelength monitoring system 100 which comprises a lens system 105, an optical diffraction grating 110, a rotating polygon 115 having a reflective mirror 120 disposed on each facet 125 thereof, an avalanche detector 130 positioned behind a slit 135, and an electronic control system 140. An imaging lens 141 is preferably disposed between rotating polygon 115 and slit 135.

Wavelength monitoring system 100 may be used to continuously monitor the wavelengths of different optical channels transmitted through an optical fiber 142 that is part of a WDM fiberoptic system. In such a system, optical fiber 142 typically carries light at various WDM wavelengths, e.g., 1500 to 1600 nm.

Lens system 105 is arranged to project the light exiting optical fiber 142 onto optical diffraction grating 110. To that end, lens system 105 may comprise a collimating lens or a collection of collimating lenses to collimate the light exiting optical fiber 142 onto optical diffraction grating 110. Optical diffraction grating 110 disperses that light and projects the dispersed light onto rotating polygon 115. The rotating polygon's highly reflective mirrors 120 reflect the dispersed light coming off optical diffraction grating 110 onto avalanche detector 130, which sits behind slit 135. The output of avalanche detector 130 peaks every time a streak of light—corresponding to a different wavelength on a designated channel—passes through slit 135 and falls on avalanche detector 130. Thus, by polling the output of avalanche detector 130 at the appropriate time, it is possible to tell if there is a signal on a particular designated channel. It will be appreciated that the size of slit 135, located between rotating polygon 115 and avalanche detector 130, will determine the resolution of the optical channel.

Since wavelength monitoring system 100 relies on (i) the relative positions of optical diffraction grating 110, rotating polygon 115, slit 135 and avalanche detector 130, and (ii) the instantaneous angular position of rotating polygon 115, in order to identify the presence (or absence) of a signal on a particular channel, it is necessary to initially calibrate the system.

The wavelength monitoring system 100 shown in FIG. 1 can be optically calibrated by synchronizing the speed (and hence the instantaneous angular position) of the rotating polygon 115 with respect to the position of avalanche detector 130.

Alternatively, the system can be calibrated by positioning avalanche detector 130 with respect to optical diffraction grating 110 and rotating polygon 115.

Figure 2:
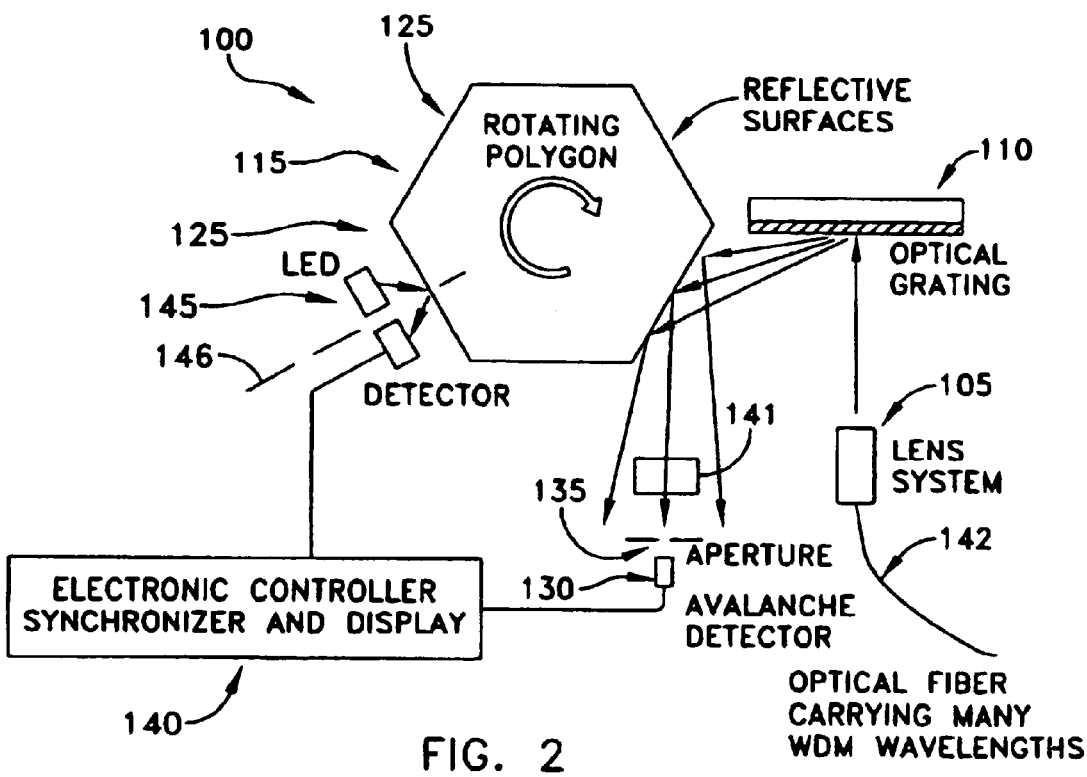
FIG. 2 is a schematic view of the system shown in FIG. 1, and further including an LED transmitter/receiver for use in calibrating the system.

Looking next at FIG. 2, system 100 is shown with additional apparatus to facilitate calibration of the system. More particularly, in FIG. 2, system 100 is shown to include a standard LED transmitter/receiver 145 which can be used to report the exact orientation of rotating polygon 115 to electronic control system 140. More particularly, LED transmitter/receiver 145 can be configured to generate an output signal whenever a facet 125 of rotating polygon 115 is disposed at a predetermined angle (e.g., 90 degrees) to the operating axis 146 of LED transmitter/receiver 145. Using this information, electronic control system 140 can then synchronize the position of the rotating polygon 115 with the other elements of the system.

Figure 3:
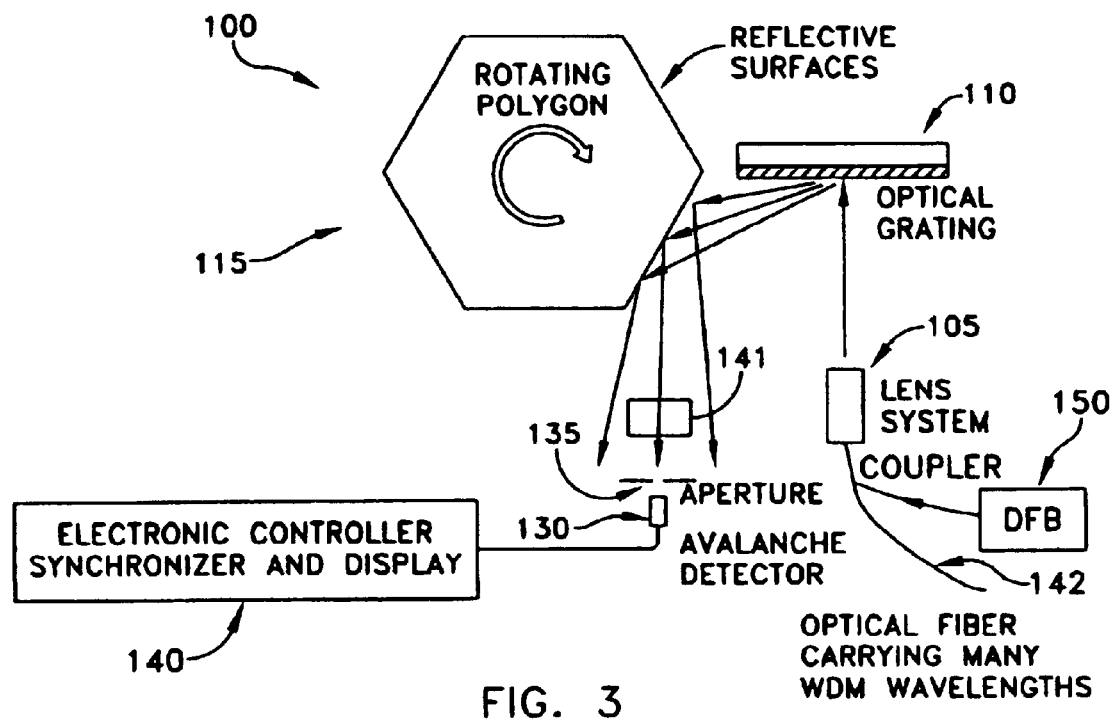
FIG. 3 is a schematic view of the system shown in FIG. 1, and further including a standard distributed feedback ("DFB") laser for use in calibrating the system.

Looking next at FIG. 3, system 100 is shown with further apparatus to facilitate calibration of the system. More particularly, in FIG. 3, system 100 is shown to include a standard distributed feedback ("DFB") laser 150. DFB laser 150 is selected so as to have a wavelength range outside the range of the WDM channels carried on optical fiber 142. DFB laser 150 is coupled into the input of lens system 105 to serve as a calibration wavelength. During calibration, DFB laser 150 provides an optical signal of known wavelength; by comparing the output of avalanche detector 130 with this known signal, the system can be properly calibrated against the known wavelength of DFB laser 150.

In the foregoing description, system 100 has been described in the context of continuously monitoring the wavelengths of different optical channels transmitted through a wavelength division multiplexed ("WDM") fiberoptic system. However, it should also be appreciated that this construction may, alternatively, also be used for different wavelength monitoring applications.

Looking next at FIGS. 4 and 5, there is shown a wavelength monitoring system 200 which comprises a grin lens 205, a hollow, transparent cylinder 210 having a thin film filter 215 deposited on a surface thereof, a high speed motor 220, and a detector 225. Thin film filter 215 is a single or multiple cavity Fabry-Perot structure having a "gap" (i.e., the distance between its opposing reflecting surfaces) which varies as a function of its position on the rim of cylinder 210. This varying gap allows thin film filter 215 to have a varying transmission wavelength, with the transmission wavelength varying as a function of the angular position of cylinder 210.

Wavelength monitoring system 200 may be used to continuously monitor the wavelengths of different optical channels transmitted through an optical fiber 227 which is part of a WDM fiberoptic system. In such a system, optical fiber 227 carries light at various WDM wavelengths.

Grin lens 205 (or other appropriate lens or lenses) collimates the light emerging from optical fiber 227. This light then passes through thin film filter 215, which is rotating at high speed by virtue of the fact that the thin film filter is deposited on cylinder 210 which is being rotated by motor 220. This, combined with the fact that different points on thin film filter 215 allow light at different wavelengths to pass through the thin film filter and onto the detector 225, allows the system to function as a wavelength monitoring system. In other words, by monitoring the output of detector 225, which is placed behind thin film filter 215, where thin film filter 215 has a transmission wavelength which varies as a function of the angular position of cylinder 210, it is possible to determine when light of a particular wavelength is passing through the system. Stated another way, by polling the output of detector 225 at the appropriate time, it is possible to tell if there is a signal on a particular designated channel.

Since wavelength monitoring system 200 relies on the varying transmission wavelength of thin film filter 215, which transmission wavelength varies as a function of the angular position of cylinder 210, it is necessary to initially calibrate the system. Wavelength monitoring system 200 may be calibrated by using a calibration emitter 230 and an aperture 235. More particularly, calibration emitter 230 emits light onto the same detector 225 through the aperture 235 which is positioned above the thin film rim. The system is calibrated for every device in such a way that the electronic signal from detector 225 signals the corresponding wavelength. The detector 225, grin lens 205 and calibration emitter 230 are preferably held together so as to ensure long term stability.

In the foregoing description, system 100 has been described in the context of continuously monitoring the wavelengths of different optical channels transmitted through a wavelength division multiplexed ("WDM") fiberoptic system. However, it should also be appreciated that this construction may, alternatively, also be used for different wavelength monitoring applications.

Numerous advantages are achieved through the provision and use of the present invention.

For one thing, the present invention provides a novel apparatus for monitoring the wavelength of a beam of light.

And the present invention provides a novel apparatus for monitoring the wavelengths of different optical channels transmitted through a WDM fiberoptic system.

The present invention also provides a novel apparatus for continuously monitoring the wavelengths of different optical channels transmitted through a WDM fiberoptic system.

And the present invention provides a novel method for monitoring the wavelength of a beam of light.

In addition, the present invention provides a novel method for monitoring the wavelengths of different optical channels transmitted through a WDM fiberoptic system.

And the present invention provides a novel method for continuously monitoring the wavelengths of different optical channels transmitted through a WDM fiberoptic system.

It will be understood that the foregoing detailed description of the preferred embodiments of the invention has been presented by way of illustration and not limitation. Various modifications, variations, changes, adaptations and the like will occur to those skilled in the art in view of the foregoing specification. Accordingly, the present invention should be understood as being limited only by the terms of the claims.

What is claimed is:

1. A wavelength monitoring system for monitoring the wavelength of light corresponding to at least one optical channel transmitted through an optical system, said wavelength monitoring system comprising:

an optical diffraction grating;

a rotating polygon having a reflective mirror on each facet thereof; and an avalanche detector positioned behind a slit;

wherein said optical diffraction grating receives the light which is to be monitored from the optical system, disperses that light, and projects the dispersed light onto at least one facet of said rotating polygon;

wherein the mirrors of said rotating polygon reflect the dispersed light coming off said optical diffraction grating so that the dispersed light continuously passes through the slit and falls onto said avalanche detector;

such that the output of said avalanche detector peaks every time a streak of light, corresponding to a different wavelength at a designated channel, passes by said detector.

2. A system according to claim 1 wherein a lens is positioned between said optical system and said optical diffraction grating for directing the light which is to be monitored in said optical system onto said optical grating.

3. A method for monitoring the wavelength of at least one optical channel transmitted through an optical system, said method comprising:

projecting the light which is to be monitored in the optical system onto an optical diffraction grating;

dispersing the light with the optical diffraction grating and projecting that dispersed light onto a rotating polygon, wherein each facet of the rotating polygon has a reflective mirror located thereon;

reflecting the dispersed light coming off the optical diffraction grating with the rotating polygon such that the dispersed light passes through a slit and falls onto an avalanche detector;

whereby the output of avalanche detector peaks every time a streak of light, corresponding to a different wavelength at a designated channel, passes by the detector.

* * * * *